US009645642B2

(12) United States Patent
Karakotsios et al.

(10) Patent No.: US 9,645,642 B2
(45) Date of Patent: May 9, 2017

(54) LOW DISTRACTION INTERFACES

(71) Applicant: Amazon Technologies, Inc., Reno, NV (US)

(72) Inventors: Kenneth Karakotsios, San Jose, CA (US); Steven Ka Cheung Moy, San Francisco, CA (US); Isaac S. Noble, Soquel, CA (US); Edwin Joseph Selker, Palo Alto, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 14/623,453

(22) Filed: Feb. 16, 2015

(65) Prior Publication Data
US 2015/0177834 A1    Jun. 25, 2015

Related U.S. Application Data

(63) Continuation of application No. 12/980,150, filed on Dec. 28, 2010, now Pat. No. 8,957,847.

(51) Int. Cl.
*G06F 3/01* (2006.01)
*G06F 3/0484* (2013.01)
(Continued)

(52) U.S. Cl.
CPC ............ *G06F 3/013* (2013.01); *G06F 3/0484* (2013.01); *G06K 9/0061* (2013.01); *G06K 9/00597* (2013.01); *G06F 3/14* (2013.01); *G09G 2320/028* (2013.01); *G09G 2340/0492* (2013.01); *G09G 2354/00* (2013.01)

(58) Field of Classification Search
CPC ............................................. G06F 3/01–3/017
See application file for complete search history.

(56) References Cited

U.S. PATENT DOCUMENTS 6,204,828 B1   3/2001   Amir et al.
6,208,373 B1   3/2001   Fong et al.
(Continued)

FOREIGN PATENT DOCUMENTS

CN    103620620    3/2014

OTHER PUBLICATIONS

"PCT Search Report," dated Aug. 7, 2012, International Application No. PCT/US2012/037220, Aug. 7, 2012, 2 pages.
(Continued)

*Primary Examiner* — David Tung
(74) *Attorney, Agent, or Firm* — Polsinelli LLP

(57) ABSTRACT

A low distraction interface can be provided for an electronic device by monitoring information such as a gaze direction of a user. A device can be configured to only display information to a user when the user is looking substantially toward the device, and can be configured to present that information in a way that is of minimal distraction to others nearby. The user can control aspects of the display by looking away from the device, continuing to look at the device for a period of time, or otherwise providing input without physically interacting with the device. Such an approach can be beneficial for settings such as business meetings where a user might want to obtain information from the device but does not want to appear inconsiderate by picking up and checking information on the device.

17 Claims, 9 Drawing Sheets

(51) Int. Cl.
*G06K 9/00* (2006.01)
*G06F 3/14* (2006.01)

(56) References Cited

U.S. PATENT DOCUMENTS

| | | |
|---|---|---|
| 6,577,329 B1 | 6/2003 | Flickner et al. |
| 6,920,376 B2 | 7/2005 | Jouppi et al. |
| 7,181,251 B2 | 2/2007 | Stohr et al. |
| 7,280,096 B2 | 10/2007 | Marvit et al. |
| 7,536,029 B2 | 5/2009 | Choi et al. |
| 7,602,942 B2 | 10/2009 | Bazakos et al. |
| 8,005,272 B2 | 8/2011 | Grim, III et al. |
| 8,194,926 B1 | 6/2012 | Keysers et al. |
| 2006/0265442 A1 | 11/2006 | Palayur |
| 2007/0097065 A1 | 5/2007 | Kreek et al. |
| 2007/0121020 A1 | 5/2007 | Ichimura |
| 2008/0193009 A1 | 8/2008 | Sonoura |
| 2009/0054077 A1 | 2/2009 | Gauthier et al. |
| 2009/0138805 A1 | 5/2009 | Hildreth |
| 2009/0251530 A1 | 10/2009 | Cilia |
| 2009/0315740 A1 | 12/2009 | Hildreth et al. |
| 2009/0315869 A1* | 12/2009 | Sugihara ............. G06F 1/1605 345/204 |
| 2010/0079508 A1 | 4/2010 | Hodge et al. |
| 2010/0125816 A1 | 5/2010 | Bezos |
| 2010/0225743 A1 | 9/2010 | Florencio et al. |
| 2011/0205148 A1 | 8/2011 | Corriveau et al. |
| 2012/0062729 A1 | 3/2012 | Hart et al. |
| 2012/0086729 A1 | 4/2012 | Baseley et al. |
| 2012/0259638 A1 | 10/2012 | Kalinli |
| 2012/0324213 A1 | 12/2012 | Ho et al. |
| 2015/0019162 A1 | 1/2015 | Hodge et al. |

OTHER PUBLICATIONS

Klein, et al., "Parallel tracking and mapping on a camera phone", 2009 IEEE.
Carbini, et al., "Tracking body parts of multiple people for multi-person multimodal interface", ICCV 2005.
USPTO Non-Final Office Action dated Mar. 28, 2013, for U.S. Appl. No. 12/980,150, filed Dec. 28, 2010, 21 pages.
USPTO Final Office Action dated Jul. 29, 2013, for U.S. Appl. No. 12/980,150, filed Dec. 28, 2010, 29 pages.
USPTO Non-Final Office Action dated Nov. 18, 2013, for U.S. Appl. No. 12/980,150, filed Dec. 28, 2010, 26 pages.
USPTO Final Office Action dated Mar. 7, 2014, for U.S. Appl. No. 12/980,150, filed Dec. 28, 2010, 30 pages.
USPTO Non-Final Office Action dated Jun. 27, 2014, for U.S. Appl. No. 12/980,150, filed Dec. 28, 2010, 32 pages.
USPTO Notice of Allowance dated Oct. 16, 2014, for U.S. Appl. No. 12/980,150, filed Dec. 28, 2010, 5 pages.
USPTO Non-Final Office Action dated Apr. 17, 2013, for U.S. Appl. No. 13/107,692, filed May 13, 2011, 25 pages.
USPTO Non-Final Office Action dated Oct. 9, 2013, for U.S. Appl. No. 13/107,692, filed May 13, 2011, 24 pages.
USPTO Notice of Allowance dated Feb. 7, 2014, for U.S. Appl. No. 13/107,692, filed May 13, 2011, 9 pages.
USPTO Notice of Allowance dated Jun. 6, 2014, for U.S. Appl. No. 13/107,692, filed May 13, 2011, 8 pages.
PCT International Preliminary Report on Patentability dated Nov. 19, 2013, for International Application No. PCT/US2012/037220, 6 pages.
JP Office Action mailed Jan. 27, 2015, for Japanese Patent Application No. 2014-511406, 7 pages.

* cited by examiner

LOW DISTRACTION INTERFACES

CROSS-REFERENCE TO RELATED APPLICATIONS

This application is a continuation application of U.S. Nonprovisional application Ser. No. 12/980,150, filed Dec. 28, 2010, entitled "Low Distraction Interfaces," which is incorporated herein by reference in its entirety for all purposes.

BACKGROUND

People are increasingly relying upon electronic devices to manage information, such as the current time, a person's schedule, business contacts, and other such information. Many of these devices are also able to receive various types of communication, such as phone calls, text messages, and email messages. Oftentimes a person will want to have access to this information through an electronic device, but might not always be able to interact with the device using conventional methods. For example, a person might be in a meeting and might not want to distract the other attendees or appear rude by physically interacting with the device. Further, a person often turns off a ringer or other audible element during a meeting, movie, or other such outing or get together, and thus can miss various important messages, reminders, and other such notifications. Vibration might attract a user's attention, but any selection or reaction currently requires the user to perform an action such as to manipulate the buttons or speak; there is currently no way for a user to obtain and control specific types of information from a device without a risk of distracting others nearby.

BRIEF DESCRIPTION OF THE DRAWINGS

Various embodiments in accordance with the present disclosure will be described with reference to the drawings, in which.

DETAILED DESCRIPTION

Figure 1:
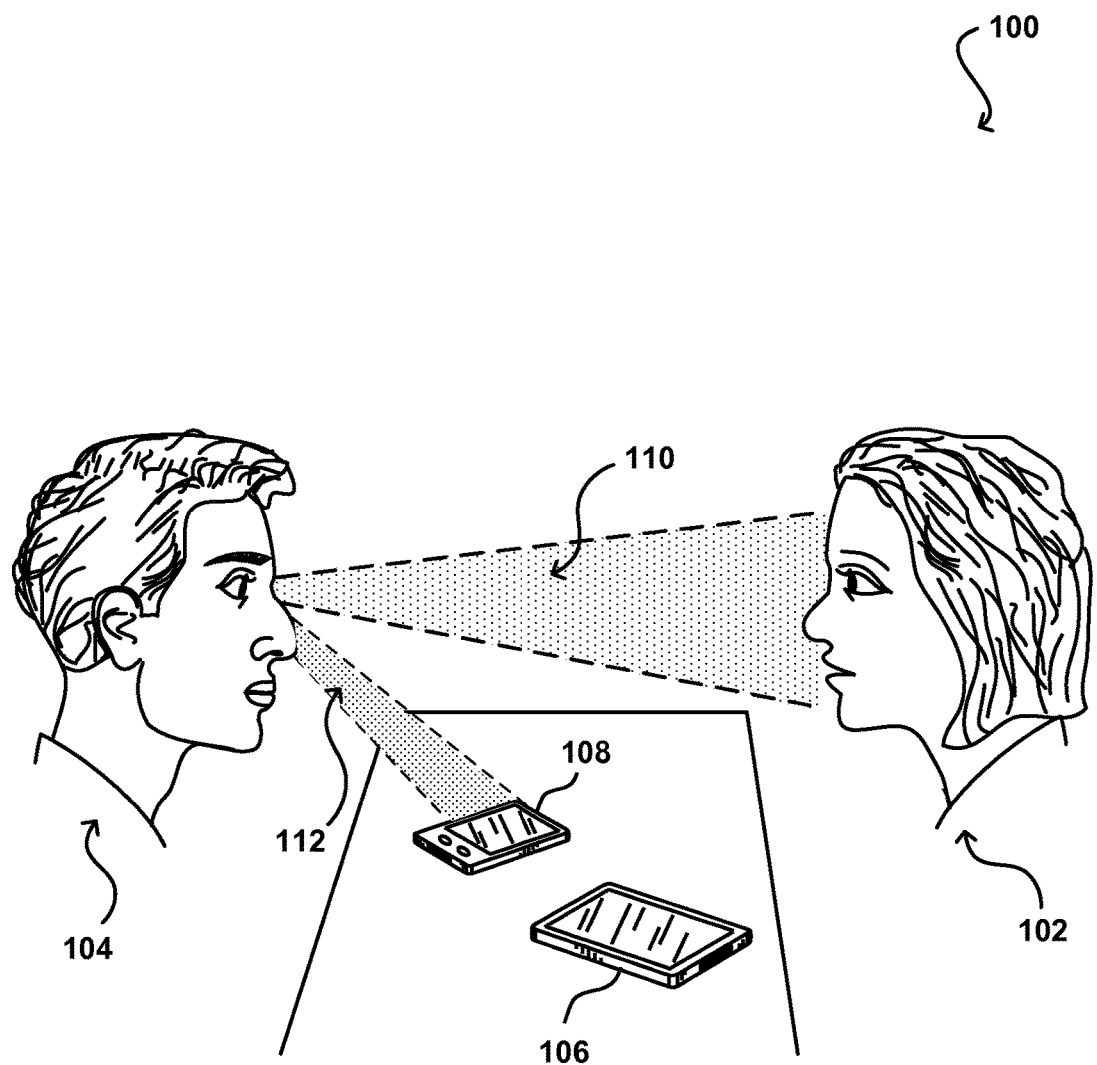
FIG. 1 illustrates an environment in which a user is able to glance at an electronic device to view information in accordance with various embodiments.

Systems and methods in accordance with various embodiments of the present disclosure may overcome one or more of the aforementioned and other deficiencies experienced in conventional approaches to enabling a user to obtain information from, or otherwise interact with, a system, device, interface or other such object or element in an electronic environment. Various embodiments enable a user to obtain and control the display of information without physically interacting with the device, enabling the user to obtain information from the device in a way that will likely provide less of a distraction than would otherwise result from conventional devices and interfaces, particularly where the user must pick up the device to control the display of information. The systems and methods described herein also enable people to obtain and respond to information if the user is unable to (or would prefer not to) physically interact with a device to request information or provide input, such as where the user is disabled or is unable to use his or her hands on buttons to request information, the user is engaged in an activity that should not be compromised (such as operating machinery), the user's hands have sterility, or other reasons not to touch a computer such as the owner having wet hands (in shower, in water, in a boat, washing dishes, etc).

In certain embodiments, a user has the ability to control the display of information on a device, and other such aspects, based at least in part upon a current gaze direction (or viewing location) of the user with respect to the device, as well as the changes in that gaze direction. For example, a device might display a certain type of information when the user is determined to be engaged in a eye gesture referred to herein as "glancing" at the device, wherein the gaze direction of the user is determined to be substantially towards the device for a relatively short period of time (e.g., less than a minimum threshold amount of time). If a user looks at the device and then looks away in less than half a second, for example, the user might be determined to have glanced at the device. If the user wants to see more of that type of information, the user can continue to direct the gaze direction towards the device for a longer period of time, which is referred to herein as "gazing" at the device. When the user is determined to gaze in the direction of the device, such as by having an eye gesture resulting in a view or gaze angle substantially towards the device for at least a minimum amount of time such as a half second or more, the device can display additional information of that type. If the user does not want to receive more of that type of information, the user can look away or perform another such action that provides input to the device indicating the user no longer wants to receive that type of information. In at least some embodiments, the device can display a different type of information the next time the user glances or gazes in the direction of the device.

In some embodiments, the device can capture and analyze image information around the device in order to attempt to recognize a nearby user and distinguish that user from any other people near the device. Such an approach enables the device to ensure that input is being processed for one user and/or the proper user, and prevents other persons nearby from accidentally, or intentionally, interacting with the device. In some embodiments, facial recognition can be used to ensure that input is only received from an authorized or primary user of the device. In other embodiments, a device might track an "active" user such that input is only received from that person while active, even where the device does not necessarily recognize that person.

A device in some embodiments can adjust the display of information based at least in part upon the detection of unauthorized persons looking at the device. For example, a device such as a tablet computer might be shared by more than one user, and the information displayed by the device can differ based at least in part upon the user determined to be presently utilizing at the device. Further, a device could be configured to respond to more than one person in the same or different ways. For example, one or more cameras of a device might point concurrently at a user and the user's friends, and might analyze the gaze direction of each user (or another such aspect) to ensure that each of those persons viewed information before moving on to another picture, etc. Similarly, a device with one or more imaging devices might monitor the gaze direction of multiple persons around the device, and can determine whether those persons are looking at the user or device, or are looking away and thus likely not paying attention. In some cases, the device might notify the user if the persons nearby are not looking at a user or presentation and thus may not be paying attention, such that the user can make adjustments or otherwise take an appropriate action.

In some embodiments, a computing device includes at least two image capture elements for concurrently/simultaneously capturing image data (e.g., images or video) in some or all directions around the device and triangulating (or otherwise determining) a relative position of a user. One or more image recognition or analysis algorithms can analyze the captured image data to detect certain events, such as: a movement, action, or gesture of a user; a relative distance to that user; or a facial recognition of a user, which can cause that user to be designated as a present source of data for input or interaction.

The relative position of specific features of a user can also be tracked by the device. For example, a device can monitor the current location of at least one specified feature of the user, such as the user's eyes or mouth, and can adjust the determined relative location accordingly. Thus, if the user moves or the device is moved such that the relative position between the user and the device is altered, the device can adjust input determination accordingly, such as to update gaze direction determinations to account for the new relative position and prevent false input.

In some cases, a person can be designated as a user without performing a specified action or otherwise being recognized by a device. For example, if a person is closest to the device or centered with respect to a particular capture element, that person can be designated as the appropriate user from which to accept input. In other embodiments, a computing device (or at least an element of that device) can be oriented towards a particular person, which can cause that person to be determined to be the current user as long as that person is within a defined area with respect to an element of the device.

In some embodiments, the device might have elements that are capable of moving or rotating to provide directionality. For example, an image capture element might include components such as a moving camera, adjustable mirror or lens, rotating gimbal, or other such element to increase the field of view and/or enable image data to be captured from a specific direction and/or distance. Any other data input or output that can be adjusted based upon a current relative position of a user.

Once the relative location and gaze direction of a user are determined in some embodiments, that information can be tracked over time and used to provide input to the device. By enabling a user to obtain and control the display of information based on inputs such as gaze direction, a low distraction interface can be provided that enables the user to utilize a device in situations where such use previously may be been determined to be inappropriate based at least in part upon the conventional interaction approaches necessary with those conventional devices.

Various other applications, processes and uses are presented below with respect to the various embodiments.

FIG. 1 illustrates an example situation 100 wherein two persons 102, 104 are engaging in a conversation, such as may be part of a business meeting. Each person has placed a device 106, 108 on the table between them. As is customary in most cultures, it is expected that the persons will engage each other during a conversation, presentation, or other such engagement, and it can be considered rude, or at least distracting, for a person to interact with his or her tablet, phone, watch, or other such device while the other person is speaking. While the appropriateness can vary as the number of persons increases and/or with the type of engagement, it still can be preferable for a person to interact with a device in a way that is the least likely to offend anyone in the meeting, cause a distraction, or otherwise detract in any way from the engagement. If a person has an upcoming meeting, for example, and wants to make sure he or she is not late for that meeting, the person might want to check the time on that person's device. In many cases, this involves the user picking up and/or physically interacting with the device to activate the display, which for conventional devices will remain active for a period of time. Even in a situation where a person is in a large room with a substantial number of people, it can be significantly noticeable if one person is continually holding and interacting with a device, which can be undesirable in many situations, such as business presentations or family gatherings.

One way to reduce the obviousness of a person obtaining information from a device would be to display that information at all times, but such an approach requires the display to be active or refreshed continually, which can waste battery power. Further, the information displayed would either be fixed or displayed according to a predetermined approach, and cannot be controlled by a user without that user physically interacting with the device. Further, displaying personal information could pose embarrassment or even a security risk for the owner or a current user of the phone.

Systems and methods in accordance with various embodiments can take advantage of the fact that many devices now have imaging elements, such as still or video cameras or infrared imaging elements, for example, that are able to continually (or at least periodically) capture information about a user. In the example of FIG. 1, the range of direction 110 in which the eyes of person 104 will gaze while looking at user 102 is substantially different from the range of direction 112 in which person 104 will gaze when looking at that person's device 108. This difference in direction can be used by that person's device 108 to determine whether the person 104 is looking substantially at the device 108. During periods when that person 104 is looking at the device 108, the device can perform certain actions, such as to activate a display element and display specific information. As will be discussed elsewhere herein, the device also can utilize the captured image information (and/or other information) to perform other actions, such as to change the information displayed or receive specific input from the user. The ability for a user to obtain information from, and provide input to, the device without having to physically interact with the device can be desirable in many situations.

Figure 2A:
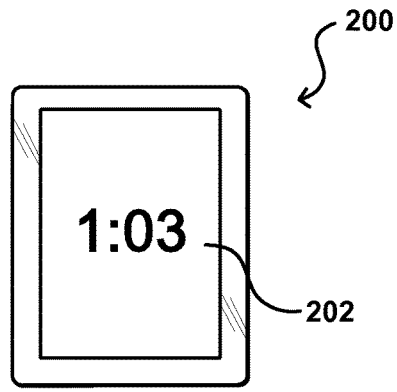
FIGS. 2(a) and 2(b) illustrate example displays that can be generated in accordance with various embodiments.

In a first example of how such an interaction can occur, an electronic device might be configured to display the time only during times when a user is gazing substantially in the direction of the device. When the user sets the device down, for example, the device might determine the relative position of the user and a gaze direction of the user. If the user is not gazing at the device, or does not gaze at the device for a minimum period of time, the device might turn off, deactivate, lower the brightness, or otherwise adjust an aspect of a display element of the device. As illustrated in FIG. 2(a), when the device determines that the gaze direction of the user is substantially towards the device 200, the device can activate (or otherwise adjust) the display element to display the time (or other specified information). In some embodiments, the time can be displayed against a background that is substantially the same color or brightness of the display when the display element is not activated, in order to minimize the distraction or noticeability of displaying the time, as turning on a bright display can be distracting to other persons nearby. In some embodiments, the display can turn on (or increase brightness) relatively slowly, such that the display does not quickly go or flash to a full brightness, which can be noticeable to other persons nearby. Various other approaches, such as to scroll the information onto the screen or otherwise minimize quick changes in brightness or other noticeable display aspects, can be used as well within the scope of the various embodiments.

In addition to determining a gaze direction of a user, a device can also determine (separately or as part of the same determination) a relative position and/or orientation of the user gazing at the device. For example, as illustrated in FIG. 1, a user might not only be at an angle relative to a tilt angle of the device, such as where the user is standing or sitting upright and the device is on a table, but the device might be placed on the table at any random orientation and/or at any given distance. Accordingly, it might be difficult for the user to read information displayed on a display element of a computing device when that device might be at any random orientation with respect to the user, such that any characters might be at an angle, sideways, or even upside down with respect to the user. Further, as a relative angle between the user and the plane of the display element increases, the appearance of the displayed characters to the user will become increasingly skewed.

Figure 2B:
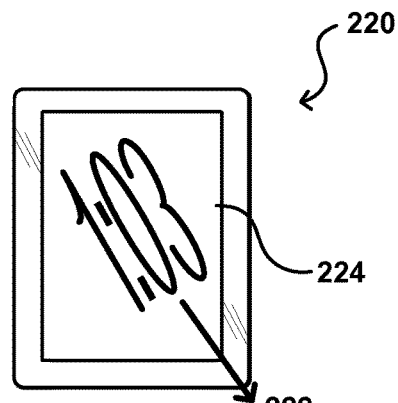

Approaches in accordance with various embodiments can utilize information such as the determined direction, distance, and/or orientation of a user with respect to the device to alter the information displayed on the device. For example, FIG. 2(b) illustrates an example wherein a display element 224 of a device 220 alters the information displayed on the display element to account for a determined relative orientation 222 of a user (not shown) gazing at the device. In this example, the time display is rotated so that the display appears substantially upright to the user at the current direction, despite the relatively oblique angle between the user and the device in its respective orientation. In addition, it can be seen that the characters are elongated (or otherwise skewed or distorted) to account for a determined relative position and/or viewing angle of the user. In this way, the characters will appear of a normal aspect ratio and angle to the user when gazing at the display from the user's current position, but will be difficult for other people to read from other angles.

In embodiments where the device contains a lenticular display, or other element capable of displaying three-dimensional or directional information, the way in which information is displayed can also be adjusted based at least in part upon a relative position or direction of a user. For example, information could be displayed in multiple levels or layers that are overlaid based on a position of the user, such that persons viewing from other angles will see a distorted image and will be unable to easily determine the information being displayed. In another embodiment, the information rendered might only be able to be seen from a specific angle, direction, or location. In still another embodiment, persons from other directions might actually see an image or other information. For example, from the position of the user the device might appear to display certain information, while from other directions the device might appear to display a clock or other basic information, which can also help to reduce distraction by ensuring that persons from most angles will not be able to detect a change in the information being displayed to the user. Such an approach also provides privacy in addition to low distraction, as only the user would be able to view the information from his or her present location, as detected by the device.

In addition to being able to display specific information to a user glancing or gazing at a device, a device also can be configured to determine and/or select specific information to display to the user. The selection or determination can be based upon any appropriate information, such as time of day, day of the week, specific events, current location, or other such information. In some embodiments, the device also can accept certain user actions as input that can be used to select or determine information to be displayed. Various other types of information can be used as well within the scope the various embodiments.

Figure 3A:
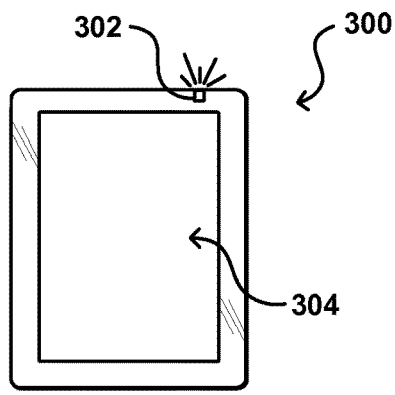
FIGS. 3(a)-3(c) illustrate example displays that can be generated in accordance with various embodiments.
Figure 3B:
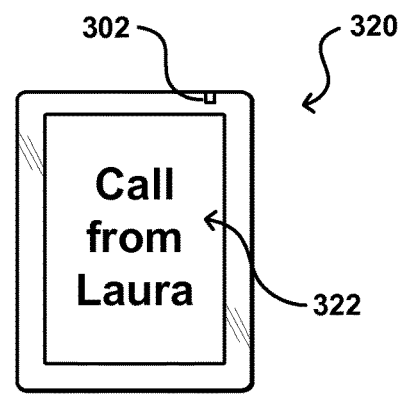
Figure 3C:
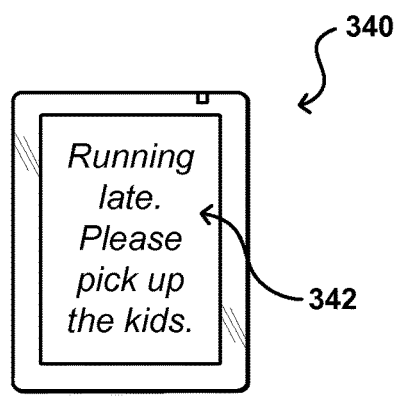

FIGS. 3(a)-3(c) illustrate a first example situation where the information displayed by a device changes based upon specific changes in state and/or user actions. In this example, a user device (e.g., a smart phone) might provide the ability to receive incoming calls. In many situations, a user of the device might not want the device to emit a ring tone or other such audible notification, such as when the user is in a movie theater or business meeting. In some embodiments, the device can simply display information about the incoming call while the call is pending, as is typical for certain conventional devices. For reasons such as distraction or privacy, however, the user might not want the device to display information about the incoming call while the call is pending.

An approach in accordance with one embodiment provides a user with a notification that a call is pending, such that the user can determine whether or not to receive information about the call, take the call, or perform another such action. For example, in FIG. 3(a) the device 300 has an illumination element 302 (e.g., an LED or other optical element) operable to change state to provide information to the user. For example, the illumination element 302 might flash while a call is pending, or change to a particular color. In one embodiment, the illumination element might turn green while no call is pending, yellow while a call is pending, and red if a call has been missed. Various other such notification approaches can be used as well. For example, a device might have a vibration element, audio enunciator, or auxiliary radio controlled device (e.g., Bluetooth) that could provide a notification to a user. If the user device 300 is in a position that is visible to the user, the user can see the notification being emitted from the illumination element 302. If the user does not want to receive information about the call, or have that information displayed, the user can simply look away from the phone. In at least some embodiments, a glance of less than a determined amount of time (e.g., less than about 30 milliseconds for a glance or less than about 300 milliseconds for a gaze, although other values can be selected as well as appropriate) might not be sufficient to cause any information to be displayed or other action taken. If, however, the user might not be interested in taking the call at this point but is interested in at least determining the source of the incoming call, the user can continue to look at the device 300 in order to indicate to the device that the user in interested in receiving additional information. Other types of input can be utilized in accordance with other embodiments. For example, if the device is able to determine gaze direction with sufficient accuracy, the device might not show information while the user is looking at the illumination element 302, but might display information about the call while the user is looking at the display element 304, a corner or position on the device, a specific selection element, or any other appropriate location.

In some situations, however, a person might not want to look away from a current task, such as when the user is driving. In at least some embodiments, various other types of notifications can be generated based upon on or more aspects of the current surroundings. For example, the device might be able to determine that it is in a vehicle (based on movement, image recognition, GPS information, wireless communications, etc.) and might switch to another mode of notification, such as an audible signal, projection, or bright flash. If the device can determine that the user is intently gazing in a specific direction, such as towards a computer screen or book, the device might also switch to an audible notification. In at least some embodiments, the device might attempt (through image or audio information, or a combination thereof) to determine how many people are nearby who might be disturbed by an audible notification or bright display, and might adjust the notification accordingly. A device also can take into account other information, such as the amount of background noise or ambient light, in order to adjust at least one aspect of a notification, such as brightness, volume, frequency, type of notification, etc.

FIG. 3(b) illustrates a second state 320 of the device after the device has determined that the user wants to receive additional information. In this example, the illumination element 302 might turn off once additional information is displayed. In some embodiments, the illumination element might stop notifying the user of the incoming call once it is determined that the user saw the illumination element providing the notification, regardless of whether the user obtains additional information. In this example, the device displays to the user information 322 about the call, such as the source of the call and in some cases the type of call or other such information.

The device can be configured (by the user, manufacturer, or another appropriate entity) to perform different actions based upon the subsequent use of the device. In one example, the user might look away from the device after viewing the displayed call information. In some embodiments, this will cause the device to no longer display information about the call and provide no more notifications about the call, although the illumination element 302 might turn a particular color to indicate a missed call, voice mail message, etc. In some embodiments, a vibration element or audio element might provide notifications, such as when a user is detected nearby and/or holding the device. In some instances the user will want to take the call after viewing the call information, and will pick up or otherwise interact with the device to take the call.

In some cases, however, the user might be interested in the call but unable to take the call at the current time (e.g., the user is in a business meeting). In at least one embodiment, the user can continue to look at the phone, look back at the phone, or perform another such action to indicate that the user is interested in receiving additional information about the call. In some cases, the device can execute at least one speech recognition algorithm against a voice mail message left by a user of the device, and can display text from that message as information 342 on the display element, as illustrated in the third state 340 of the device in FIG. 3(c). In some cases, the device might scroll the information as long as the user continues to look at the device (assuming the message is longer than can fit on the display at one time). When the user stops looking at the device, the device can stop showing the message.

In another embodiment, the device might ask the caller for information to be conveyed to the user. It is possible that the caller might not intend to leave a voice mail message, such that the device will not be able to obtain additional information, or the caller might leave a long voice mail message, or a message with personal information, which might be undesirable to display in certain settings. A device thus can be configured to answer the call and provide information and/or a specific request to the caller. In one example, the device can indicate to the caller that the user saw that the caller is on the line but is currently unable to take the call. The device then can ask the caller for a brief message to pass along to the user as in FIG. 3(c). The device can perform speech recognition on the message and display that message to the user. An advantage of asking the caller for a brief message is that the caller will likely present a concise message that will be appropriate for a public setting. The device can also keep a log of glance and gaze activity, for example, which can help to assure a user that the user viewed or otherwise interacted with the device with respect to certain information. For example, a message might go from an "unread" to a "read" state if the user is detected to have gazed at the message for at least a minimum period of time, which can vary based upon aspects such as the type of message, speed of comprehension for a given user, etc. In other cases, an icon or other indicia can be provided that a user at least glanced at a message, such as where the user likely looked at some aspect of the message and decided for any reason not to obtain more information at that time. In at least some embodiments, the device also can display the date(s) and time(s) in which the user glanced at the message or other such information. Various other states are possible as well, such as opened by not read, scanned, etc. In some cases, the messages can be filtered, flagged, or moved based at least in part upon such information, enabling a user to perform tasks such as to view messages that the user glanced at during a meeting, but did not read in detail.

In some embodiments, the device can convey more specific information to the caller. For example, the user might not want the device to simply tell the caller that the user cannot take the call, as that may give the impression that the user is screening calls and/or does not want to accept a call from that caller. If the device has access to the user's calendar, or can determine a present location using GPS data or other such information, for example, the device can pass along a more specific message. For example, the device can indicate to the caller that the user is in a meeting until 10:00 or the user is in a movie theater, etc., such that the caller learns that the user is not taking the call due to the user's surroundings or current situation, instead of for any personal reasons (whether entirely true or not). Such messages also can be configurable by a user, as a user might not want to tell his or her boss that the user is at the movies on a day that the user called in sick, for example. In some embodiments, the user can provide a recorded message asking the caller to provide a brief message, etc.

Various other types of information can be conveyed to a user of a device as well using similar and alternative approaches. For example, in FIG. 4(a) a first state of a user device 400 indicates that a text message has been received from a particular party. This message can be displayed shortly after the text message has been received, similar to the phone call example above, or could be displayed when the user is attempting to obtain information from the device. For example, a user might be unable to physically interact with the device, but might want to obtain various types of information, or a certain type of information, from the device. A user viewing the message of FIG. 3(c) might not be interested in that message, but might be interested in obtaining other information. In such a situation, the user might glance away from the device, then glance back at the device. Such actions can provide input to the device that the user is interested in obtaining different information. The device in such an instance can determine other information to display to the user. This information might be predetermined, such as by selection of the user or a device manufacturer, or might be determined dynamically based upon the available information. For example, in FIG. 4(a) the device indicates to a user that a new text message has been received. Information about text messages might only be displayed if a new message has been received since the last time the user obtained information about text messages. In some embodiments information about a new text message will take priority over other types of information (at least for a period shortly after the message is received) while in other embodiments the information will scroll or otherwise be selected according to a predetermined order, ranking, priority, etc.

Figure 4A:
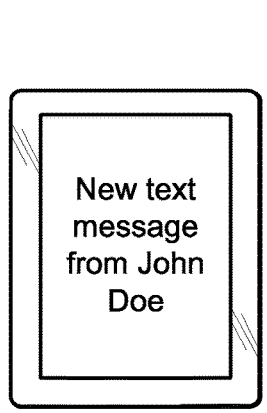
FIGS. 4(a)-4(d) illustrate example displays that can be generated in accordance with various embodiments.
Figure 4B:
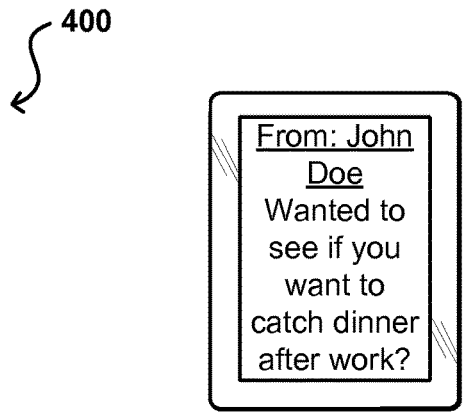
Figure 4C:

When the user views information about the text message in FIG. 4(a), the user in at least one embodiment can continue to look at the device for a period of time in order to obtain additional information about that message, such as is illustrated in the example state of the device 420 in FIG. 4(b). If the user was not interested in receiving additional information about that text message, or does not want the content of the message displayed, the user could look away (or perform another such action) and look back at the device to obtain a different type of information, such as information about recently received email messages as illustrated in the example state of the device 440 in FIG. 4(c). The device might flash an important or private message quickly on a screen for security purposes or where otherwise appropriate, while in other situations the device might slowly transition between types of information in order to reduce the likelihood that others nearby will be distracted by the change, etc. In some embodiments, the device enables the user to look away and then gaze back to continue reading the same type of information. In such a case, the user might have to perform a certain action, such as to nod, blink for a long period of time, or look at a specific area on the device in order to move or scroll to a different type of information.

In some embodiments, the information displayed can depend at least in part upon the amount of time that has passed since the user last looked at the device. For example, if the user looks at the device and views the time, the user might not need to see the time again if the user looks back within a short period of time, such as within two or three minutes. If it is ten minutes between glances, for example, the device might again display the time. If the time between glances is a matter of seconds, on the other hand, the device might decide to display a different type of information.

In some embodiments, the user can also provide other types of input to the device for other purposes. For example, in FIG. 4(b) the device displays a message from a friend asking if the user wants to catch dinner after work. In some embodiments, the device can be configured to accept user input in response to the message and provide a response to that friend. For example, the user could shake his or head in a "no" movement, which could cause the device to send a reply message to that friend that the user is unable to go to dinner after work. If the user instead makes a "yes" motion, or performs another specific movement or gesture, or looks at a "yes" button on the device, etc., the device can respond with a message indicating to the friend that the user will meet the friend for dinner after work. In some embodiments, the device can also be configured to automatically make dinner reservations or perform another such action, information for which then can be sent to the friend and/or displayed to the user, added to the user's calendar, etc.

When a user is viewing information about email messages, for example, the device might flag messages as having been read (or at least not being new messages) when the user has at least had the change to view information such as the subject line and sender information. In some embodiments, the user can configure the device to delete items upon short user glances, the user not being interested in additional information, the user performing a specific action, etc. In some cases, a user might be able to flag a message to be addressed later, etc.

Figure 4D:

In some cases, there may be notifications or other information that the user wants passed along regardless of the setting or user actions. For example, the user might have a meeting or appointment scheduled, and want to be reminded a certain amount of time beforehand. As illustrated in FIG. 4(d), the device might provide a visual reminder such as in the state 460 illustrated, whereby the device displays that the user has a meeting coming up in five minutes. In some embodiments, the information might no longer be displayed after the user looks at the display long enough to read the information. In other embodiments, the information might be displayed until the time of the meeting, or the user picks up the device to go to the meeting, for example, as may be determined by an accelerometer, touch-sensitive surface, or other such element. In some embodiments, the device can contact attendees of the other meeting if the user is going to be late, or can perform another such function.

As mentioned briefly above, in some embodiments a user can provide specific types of input to the device through actions such as motions or gestures. For example, a user can move his or her head, blink, smile, move a hand, or perform any other type of action that can be detected by the device and used to provide input. While such actions might be appropriate for certain settings, such as a movie theater or auditorium, such actions might not be appropriate for a small meeting or get together. In some embodiments the user can activate or deactivate these options, while in other embodiments the device can learn the type of inputs the user wants to use based upon current user behavior, surrounding information, calendar information, etc.

Figure 5:
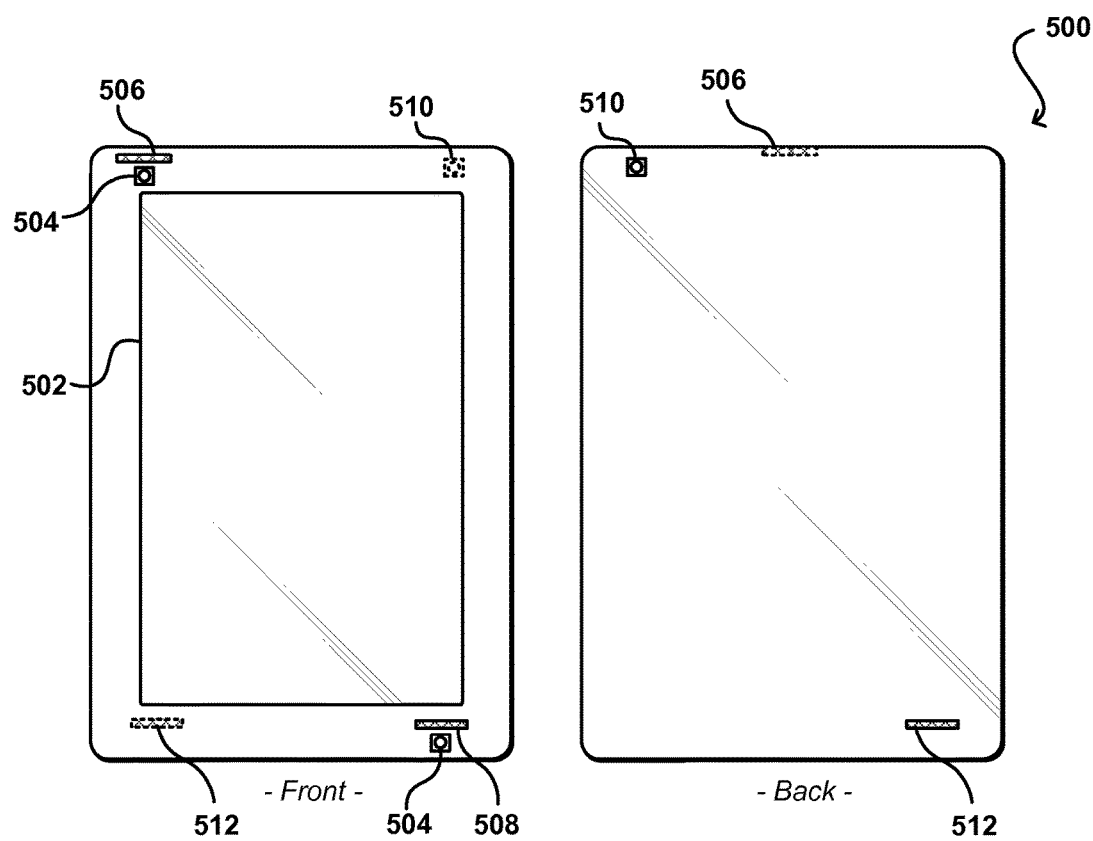
FIG. 5 illustrates front and back views of an example of a computing device including elements operable to capture audio and video information that can be used in accordance with various embodiments.

FIG. 5 illustrates front and back views of an example computing device 500 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502, which under normal operation will display information to a user facing the display screen (e.g., on the same side of the computing device as the display screen). The computing device in this example can include one or more image capture elements, in this example including two image capture elements 504 on the front of the device and at least one image capture element 510 on the back of the device, although it should be understood that image capture elements could also, or alternatively, be placed on the sides or corners of the device, and that there can be any appropriate number of capture elements of similar or different types. Each image capture element 504 may be, for example, a camera, a charge-coupled device (CCD), a motion detection sensor or an infrared sensor, or other image capturing technology. The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations. The device also can utilize outputs from at least one of the image capture elements 504 and 510 to assist in determining the approximate direction, distance, or relative position of a user or other nearby person. For example, if the user sets the device on a table and the user is standing to the right of the device, the captured image information can be analyzed to determine the approximate direction and/or location of the user, and can cause the device to capture image information from primarily that relative position.

Figure 6:
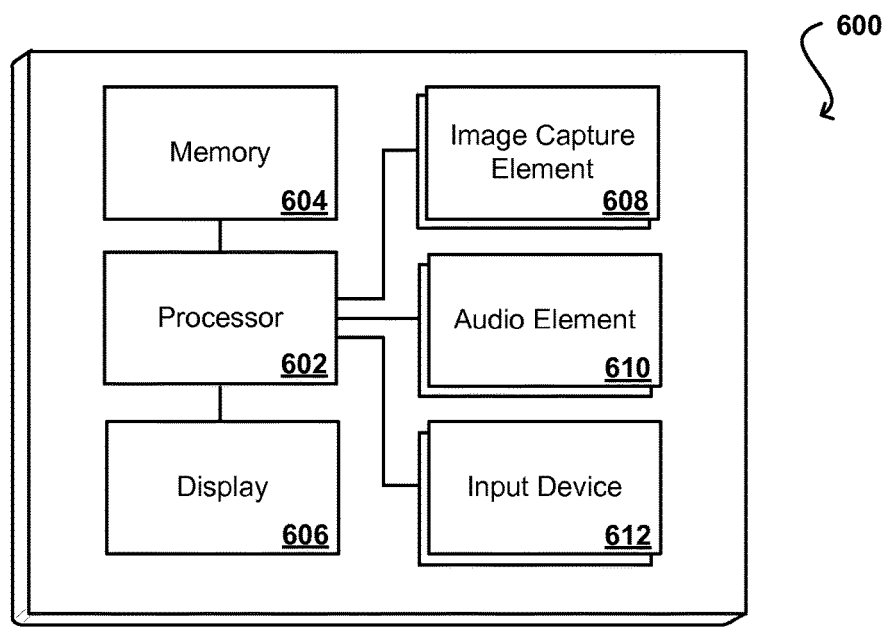
FIG. 6 illustrates example components of a computing device such as that illustrated in FIG. 5.

FIG. 6 illustrates a set of basic components of a computing device 600 such as the device 500 described with respect to FIG. 5. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the processor 602, the same or separate storage can be used for images or data, a removable memory can be available for sharing information with other devices, and any number of communication approaches can be available for sharing with other devices. The device typically will include some type of display element 606, such as a touch screen, electronic ink (e-ink), organic light emitting diode (OLED) or liquid crystal display (LCD), although devices such as portable media players might convey information via other means, such as through audio speakers. As discussed, the device in many embodiments will include at least two image capture elements 608, such as at least two cameras that are able to image a user, people, or objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

Further, a device can include the ability to start and/or stop image capture, such as when receiving a command from a user or an application, or retrying to determine an audio input or other device. In some embodiments, a device can include an infrared detector or motion sensor, for example, which can be used to activate an imaging element, image analysis, etc. For example, a device might not capture and analyze image information when there is not a user in the room. If an infrared detector (i.e., a detector with one-pixel resolution that detects changes in state) detects a user entering the room, for example, the device can activate a camera in an attempt to locate the user, perform image analysis, etc. Further, a device could display information such as the current time or other information when a person is detected to likely be nearby, instead of waiting for the user to glance towards the device. Such an approach also can be advantageous because it can require less input from the user (and thus potentially less processing) to first determine the user is glancing at the device to show the time or default information, for example, then requiring a second input to change the information. The device may also include various mechanisms to provide the ability to retry to determine a user input.

The device can include at least one additional input device 612 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

In at least some embodiments, a device can utilize at least one image capture element and/or audio capture element to attempt to recognize or authenticate the identity of a particular user. In one example, there might be several people sitting around a table on which the device has been placed, and these people might shift positions over time. If the device is able to capture images of these people, or capture voice data, etc., the device can attempt to identify at least the primary user of the device, if not others around the device. In some embodiments the device can use image or voice recognition, while in other embodiments heat signatures or other appropriate types of information can be used. Being able to determine the identify of the user can help to ensure that only an authorized user is able to provide input to the device. In some embodiments, the ability to tell that a person who is not an authorized user is glancing at the device can cause the device to perform other actions, such as to turn off a display or only show certain types of information, in order to prevent unauthorized users from viewing private or sensitive information on the device. In some embodiments where there can be multiple authorized users, the ability to recognize the identity of a given user can enable the device to display information that is relevant to that user, in ways that are customized for that user. For example, if a husband and wife share a device and the wife is gazing at the device, the device can display information such as messages that were received for the wife, information indicated to be of interest to the wife, etc. If the wife prefers to use gaze input and the husband prefers to use motion input, the device can accept different types of input based upon the identity of the current user. Various other differences in functionality can be presented based on user identity as well within the scope of the various embodiments.

Figure 7:
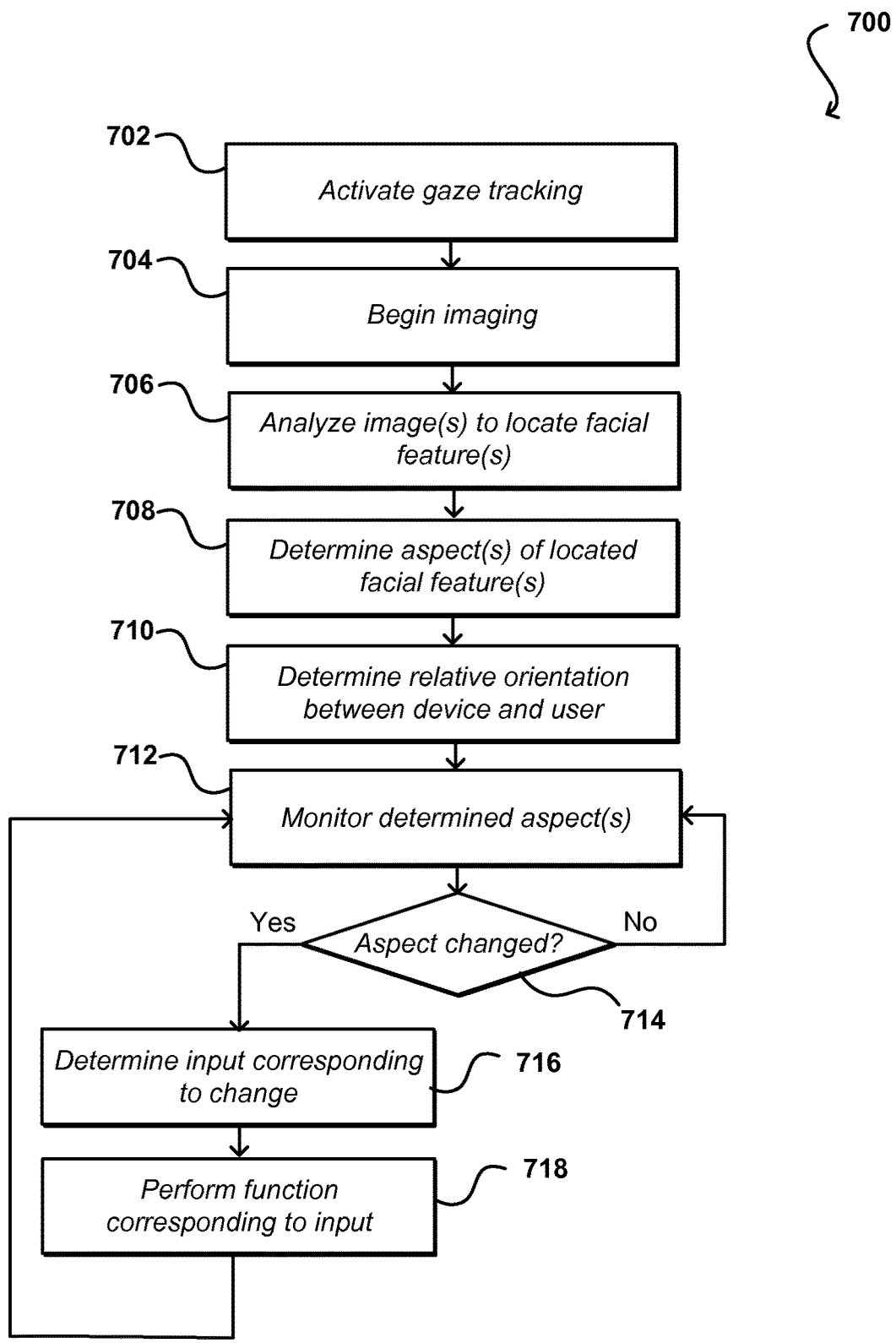
FIG. 7 illustrates an example process for determining user input that can be used in accordance with various embodiments.

FIG. 7 illustrates an example of a first portion 700 of a process for providing a low distraction interface that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, gaze tracking is activated on the device 702. In some embodiments a user must activate this mode manually, while in other modes the device can activate the mode when the device is placed on a surface or otherwise determined to not be held by a user, is not stored or concealed (such as in a pocket), and at least one person is detected to be nearby. Other modes of activation are possible as well. When the gaze tracking is active, the device can begin imaging around the device 704, whether in all directions, some directions, a specific range of directions, or a direction substantially toward an identified user. As discussed, in some embodiments the imaging will involve ambient light image or video capture, while other embodiments can utilize infrared imaging, heat signature detection, or any other such approach. The device can analyze the captured image information to attempt to locate facial features of a user 706, or at least a person nearby, where those features in some embodiments include at least the eyes of a user.

Once the facial features are located, the device can attempt to determine aspects or information relating to those features 708. In this example, the determined aspects can be used to attempt to determine a relative orientation between the device and the user, as well as the orientation of those features relative to the device 710, which can be useful in determining information such as the present gaze direction or viewing location of a user. The determined aspects then can be monitored over time 712, such as by continuing to capture and analyze image information to determine gaze direction or viewing location. A change in the aspect, such as a change in gaze direction, can be determined 714, and the device can determine whether that change in gaze direction corresponds to an input 716. For example, a user gazing at a different portion of the device might not qualify as an input in some instances, while the user gazing substantially away from the device might be registered as input. If the aspect change corresponds to input, the device can perform the function corresponding to that input 718, such as to display different information, turn a display on or off, or perform any other action discussed or suggested herein.

Figure 8:
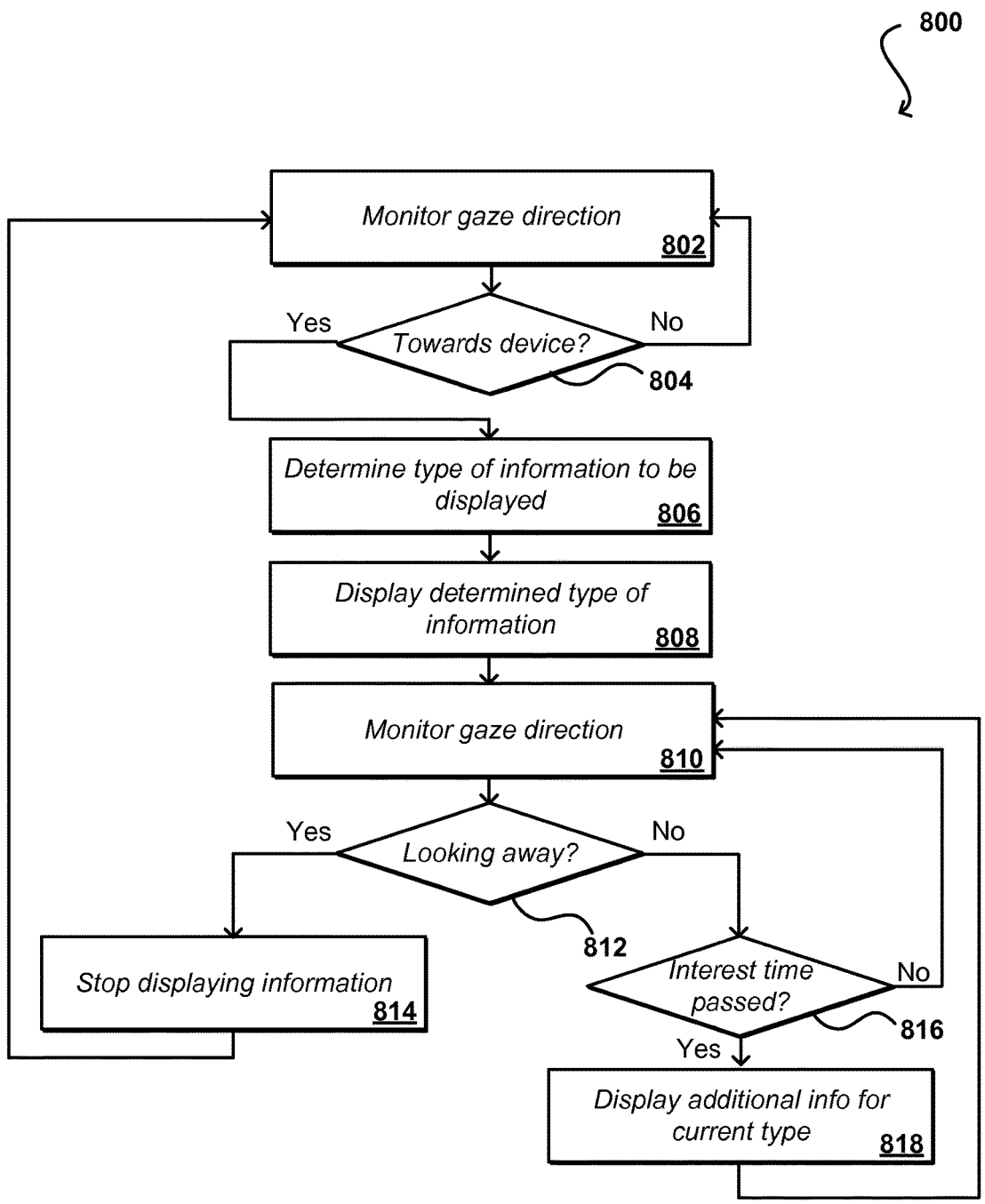
FIG. 8 illustrates an example process for managing the display of information in response to user input that can be used in accordance with various embodiments.

As an example of such actions, FIG. 8 illustrates a second portion 800 of a process for providing a low distraction interface that can be used in accordance with various embodiments. In this example, the information displayed will be based at least in part upon the gaze direction of a user, although various other approaches could be used as well as discussed elsewhere herein. During operation, an electronic device can monitor the gaze direction of a user 802. If the gaze direction is determined to be at least substantially towards the device in this example 804, the device can determine the appropriate type of information to be displayed 806. As discussed, the appropriate type of information can be selected for any of a number of reasons based on any number of factors, such as user preference or behavior, device settings, recent events, current location, etc. The determined type of information then can be displayed on a display element of the device 808, or otherwise conveyed in other embodiments. The device can continue to monitor the gaze direction of the user 810. If the user is detected to look away 812, the device in this example can stop displaying the current information 814. When the user subsequently looks back at the device, the device can make another determination of the appropriate type of information to display, which might be the same or different based on various factors or for various embodiments. If the user has not looked away, the device can determine whether the user has gazed at the device for a threshold amount of time, or at least an amount of time indicating that the user is interested in the currently displayed type of information 816. If so, the device can display additional information of that type 818, such as to display the content of an email message or news story, information about an upcoming meeting, etc. As discussed, a user can utilize such an approach to view information of interest on the device without actually having to physically interact with the device.

Figure 9A:
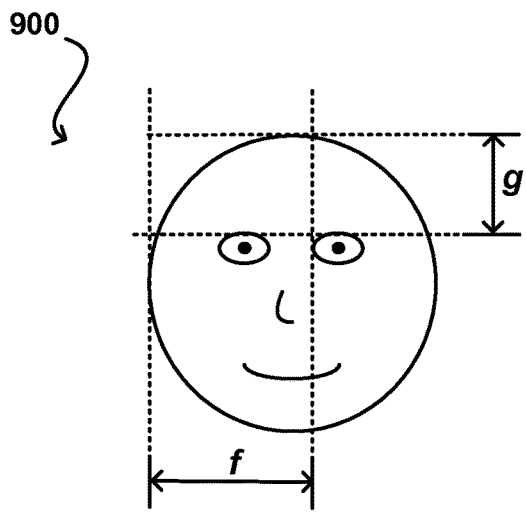
FIGS. 9(a)-9(c) illustrate example approaches to determining glance direction that can be used in accordance with various embodiments.
Figure 9A:
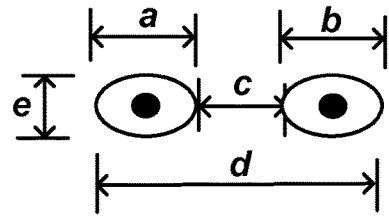
Figure 9B:
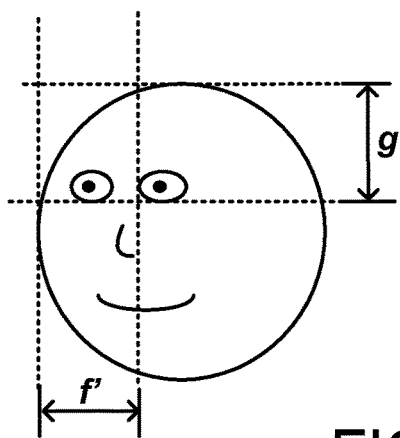
Figure 9B:
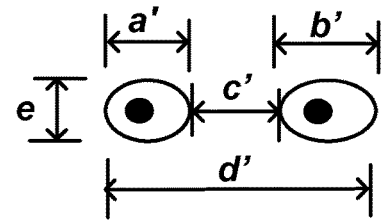
Figure 9C:
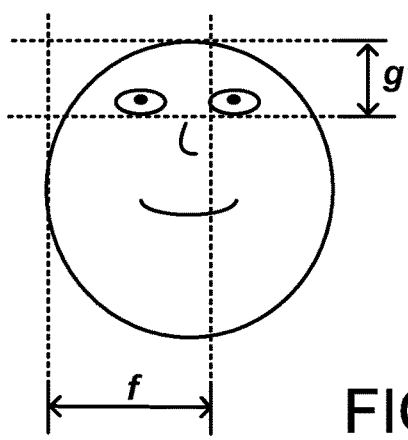
Figure 9C:
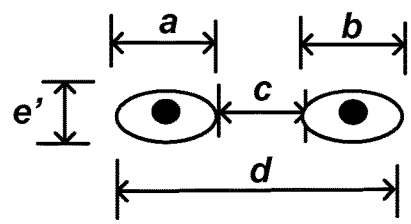

In order to determine the gaze direction of a user for such a process, the device in at least some embodiments has to determine the relative position of the user relative to the device, as well as dimensions or other aspects of the user at that position. FIG. 9(a) illustrates an example 900 wherein images are captured and analyzed to determine the relative positions of the user's head and the user's eyes. In a system wherein the algorithm is able to differentiate the user's pupils, the system can also utilize the relative position of the pupils with respect to the eye position. For example, FIG. 9(b) illustrates a case where the user is looking "left" (or to the user's right"), such that a center point of each user's pupil is to the left (in the image) of the center point of the respective eye. Similarly, FIG. 9(c) illustrates a case where the user is looking "up". As can be seen, the positions of the pupils have moved above a center point of the eyes. The position of the pupils can change without the user moving his or her head. Thus the system may be able to, in some embodiments, detect a glance without a change in head position. A system in accordance with one embodiment can take advantage of such information by adjusting the display of the computing device according to the detected position of the user's pupils relative to the user's eyes, and thus the determined area on the display at which the user is looking. A system can also detect movements such as a user closing his or her eyes for an extended period of time, wherein the device can perform an action such as placing an electronic book reader in a "sleep" or power-limiting mode, deactivating image capture, or powering off the device. A system in some embodiments can differentiate between different types of movement, such as between eye tremor, smooth tracking, and ballistic movements. In some embodiments, a user can provide specific input though various eye gestures, such as for a glance or gaze associated with a specific ballistic movement. A system could also require no ballistic movement in a continued gaze for certain input or actions, such as to enable a user to obtain additional information of the current type.

In one embodiment, a user calibrates a device by looking at each of a number of targets on a screen, such as at each corner, whereby the device can detect relative positions of the pupils to the eyes of the user for different locations on the display. Thus, when a user looks to a certain portion of the display, the device can act accordingly. For example, if a user is reading an electronic book, the device can automatically scroll the page up, or turn to the next page, when the user gets to the bottom of the current page. In another example, a user can select from a number of elements on the display simply by looking at that element. In other embodiments where the device cannot determine the user's gaze accurately enough to select an isolated portion of the screen, the device may sequentially present the user with different choices one at a time. The user might accept a choice, when it appears on the screen, with a blink or other such action or gesture. In one example, a user might submit a search query and receive a list of search results. A user can view the results, and if one of the results is of interest to that user, the user can submit input while looking at that item. For example, a user can look at the fourth item on the list and perform an action such as blinking twice or saying the word "open" and the device can determine to open a document corresponding to the element at which the user is looking. A user looking at a specific area of interest also can cause the display to zoom into that area and the surrounding area (any number of times) until a specific area of interest is identified. In some cases, a user might look at a position on the display and say "zoom" or perform a detectable motion such as nodding forward. In another example, if there are multiple levels to a display, or if there are multiple "zoom" levels, the display can automatically zoom in or out depending on where the user is looking, as long as the user looks for a sufficient period of time. For example, if a user is looking at a map and looks at a particular state, after a few seconds the display might zoom in to show that particular state (and maybe surrounding states). If the user looks to another state while zoomed in, the display can either shift to that state or zoom out whereby the user can select another state. A display also can have icons or elements corresponding to zoom commands, such that a user wanting to zoom in can look at a "zoom in" element and may also look at the specific area at which the user wants to zoom. The display can take these inputs and zoom at the desired location. Further, any distinguishable eye gesture might be available to control the zoom or other action. A blink, wink, or rolling of eyes can all be distinguishable gestures that could potentially augment an action such as zooming or selecting items.

Figure 10A:
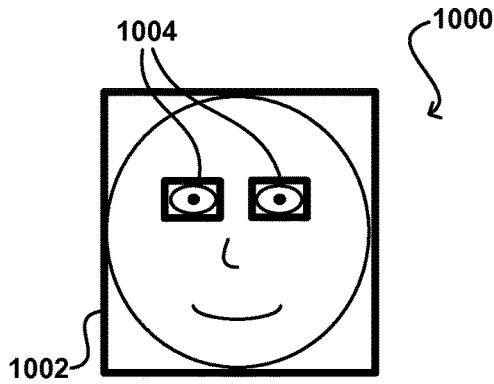
FIGS. 10(a)-10(f) illustrate example approaches to determining user input that can be used in accordance with various embodiments.

Various approaches can be utilized for locating one or more desired features of a user's face to determine various aspects useful for determining relative orientation. For example, if a user's head is to be used as input, there can be many objects that can be shaped similar to a human head that could give false readings. Also, a user nodding "no" might not actually move the position of the user's head enough to register the movement. Accordingly, various approaches utilize features such as a user's eyes to assist in position and movement determination. For example, an image can be analyzed to determine the approximate location and size of a user's head or face. FIG. 10(a) illustrates an example wherein the approximate position and area of a user's head or face 1000 is determined and a virtual "box" 1002 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 1004 of each of the user's eyes (or in some cases the eyes in tandem). By determining the location of the user's eyes as well, advantages can be obtained as it can be more likely that the image determined to be the user's head actually includes the user's head, and it can be determined that the user is facing the device. Further, the relative movement of the user's eyes can be easier to detect than the overall movement of the user's head when performing motions such as nodding or shaking the head back and forth.

Figure 10B:
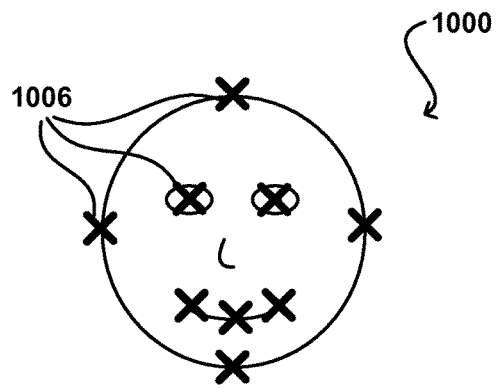

Various other algorithms can be used to determine the location of features on a user's face. For example, FIG. 10(b) illustrates an example wherein various features on a user's face are identified and assigned a point location 1006 in the image. The system thus can detect various aspects of user features and can determine changes such as movement or change in shape or expression. Such an approach provides advantages over the general approach of FIG. 10(a) in certain situations, as various points along a feature can be determined, such as the end points and at least one center point of a user's mouth. Accordingly, expressions such as a smile or frown can be captured even though the overall position of the user's mouth or face did not move.

Figure 10C:
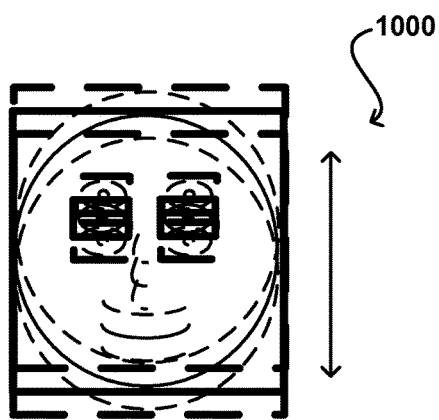
Figure 10D:
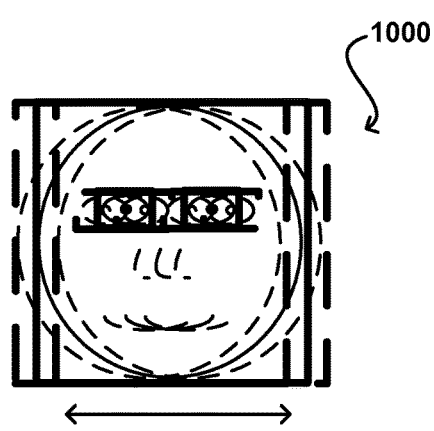
Figure 10E:
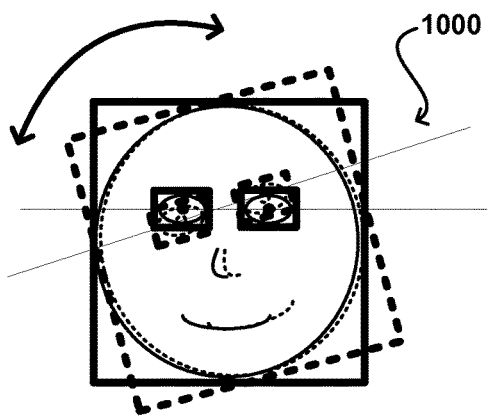

Once the positions of facial features of a user are identified, relative motion between the user and the device can be detected and utilized as input. For example, FIG. 10(c) illustrates an example where the user's head 1000 is moving up and down with respect to the viewable area of the imaging element. As discussed, this could be the result of the user shaking his or her head, or the user moving the device up and down, etc. FIG. 10(d) illustrates a similar example wherein the user is moving right to left relative to the device, through movement of the user, the device, or both. As can be seen, each movement can be tracked as a vertical or horizontal movement, respectively, and each can be treated differently as an input to perform a specified function. In one example, the monitored movements are used to control the position of a cursor on the interface display by following the up, down, and across motions. As should be understood, such a process also can detect diagonal or other such movements. FIG. 10(e) further illustrates an example wherein the user tilts the device and/or the user's head, and the relative change in eye position is detected as a rotation. In some systems, a "line" that corresponds to the relative position of the eyes can be monitored, and a shift in angle of this line can be compared to an angle threshold to determine when the rotation should be interpreted as input.

Figure 10F:
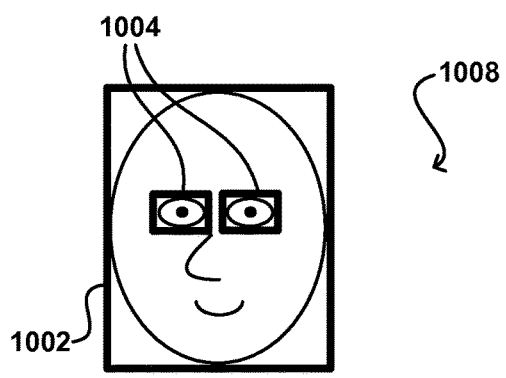

FIG. 10(f) illustrates another advantage of using an approach such as that described with respect to FIG. 10(b) to determine the position of various features on a user's face. In this exaggerated example, it can be seen that the features of a second user's head 1008 have a different relative position and separation. Thus, the device also can not only determine positions of features for a user, but can distinguish between different users. As discussed later herein, this can allow the device to perform differently for inputs from different users. Also, the device can be configured to detect how close a user is to the device based on, for example, the amount and ratio of separation of various features, such that the device can detect movement towards, and away from, the device. This can also be accepted as input, and can be used to perform actions such as three-dimensional (3D) navigation.

Further, although many embodiments are described with respect to facial features and/or head movements, it should be understood that a device can capture and analyze other types of movement useful for providing input. For example, a user might be able to manipulate a cursor on a display by changing a hand position or "drawing" in the air. A user also might be able to hold up a number of fingers to provide numerical input, such as by holding up three fingers, then two fingers, then four fingers (possibly followed by some end command) to input the number "324". In one embodiment, a user can hold up any number of fingers in any distinguishable orientation to provide input, and in some embodiments can use representations (e.g., letters, words, or phrases) to provide input. For example, if a user is filling out a form to purchase an item and needs to fill in a shipping address, the user might be able to perform a motion such as holding up a specific finger, making a motion for "home", or any other appropriate motion, whereby the device knows to fill in the form using the "home" address information stored for the user.

It also should be understood that complex motions used for input can involve a combination of facial movements and device movements. For example, a user wishing to shut the device down might perform actions such as tilting the device to the right and then nodding up and down. In this way any eye, head or hand gesture can be used; a wrinkling of the brow, a winking of an eye, and a tipping to the side can all be distinguishable. Any of a number of combinations of actions to act as inputs should be apparent to one of ordinary skill in the art viewing the teachings and suggestions contained herein.

In some embodiments, a computing device can determine and track an approximate area or region of interest corresponding to the user's eyes, or another such feature, in the captured images such that an algorithm of the computing device only has to analyze image data corresponding to that region, which can significantly reduce the amount of processing needed for images, particularly for high resolution, full color images.

In at least some embodiments, a device is able to distinguish between movement of the user and movement of the device, such as by detecting movement of a background or other aspect of the images, by analyzing the separation, shape or size of various features, or using movement sensing elements such as an accelerometer. Thus, in embodiments described herein that use the image capture element to determine an orientation or location of the device relative to its user, a user can have an option of inputting a given type of motion which corresponds to a specific command by moving the device, altering an aspect of the user or both. Further, the direction of audio capture can be adjusted based at least upon the determined action, such as a tilting of the device as measured by an accelerometer or gyroscope, to improve upon the precision of the image analysis.

A number of other approaches can be used as well within the scope of the various embodiments. For example, thermal imaging or another such approach could be used to attempt to determine and track the position of at least some aspect of a human user. In many instances the imaging system is desired to be small and inexpensive enough for mass marketing, such that simple or conventional imaging approaches and components can be preferred. Certain existing cameras can detect infrared radiation, but typically utilize an IR filter. Utilizing these cameras without the IR filter, and potentially with an ambient light filter, can allow these relatively inexpensive cameras to be used as IR detectors.

As discussed, it can be desirable with any optical approach to perform at least an initial calibration procedure, as well as potentially additional and/or periodic recalibration. In one embodiment where two or more cameras are used, it can be advantageous to periodically capture images of a grid or similar pattern in order to calibrate for bends or physical changes in the optics. In some embodiments where an initial calibration is performed during the manufacturing process, the user might only need to have the device recalibrated when performance begins to degrade, or at any other appropriate time. In some embodiments a progressive automated calibration procedure may be utilized. In this case the system can look for a shape resembling a person's head, and can become increasingly convinced that the shape corresponds to a head with eyes, specific features, etc. In this case confirmation might be all that is required allow the system to auto calibrate as opposed to requiring a person to specifically do specific things at specific times, such as to look at specific corners of the device, etc. Such an approach instead assumes certain information and fine tunes this information over time, oftentimes unknown to the user.

As mentioned above, various approaches can be used to attempt to conserve resources such as power consumption, particularly for portable or hand-held devices. For example, a video camera (typically very power intensive) might not be activated until a user is determined to be glancing in the direction of the device. In other embodiments, a low resolution image capture element might be used to determine when a user is making a gesture or performing an action, and a high resolution image capture element (or high resolution state of the same element) can be activated when needed for analysis. In some embodiments, an IR emitter and detector can be used to monitor the user's eyes or teeth (which will generally reflect IR) such that the device can detect when the user moves, or the user's lips begin to move, using the lower-power IR element(s) and then activate an ambient light camera in response to the detected lip movement. In some embodiments, a standard image capture element can be used to continually (or otherwise) capture image information, but would capture this information as compressed data and the device would only decompress and analyze the data when certain rules or criteria are satisfied, such as audio speech patterns being detected. In some embodiments, the camera could be turned on when a user reaches a certain interface or state and might be turned off after a period of inactivity while other mechanisms (e.g., audio) are used to monitor user input. In some situations, the camera can turn off after the user reaches a certain state or begins a particular activity, such as reading an electronic book on the device, except where voice control is used to flip pages or perform other such activities.

In some embodiments, a device can attempt to determine the necessary brightness, contrast, or other such aspects of a display to be utilized based on current conditions. For example, the device might analyze information such as the dilation of a user's pupils or the amount of surrounding ambient light to attempt to adjust aspects of the display in order to conserve power while still enabling the user to read the screen. For example, one type of screen might not have to be as bright in a dark room as when the device is outside in the daylight. By monitoring aspects of the surrounding environment, the device can reduce power consumption without significantly degrading the user experience.

Being able to determine information about the surrounding environment can also help the device to adjust various functionality as appropriate. For example, if the phone (through image analysis, heat signatures, etc.) determines that a user is alone in a room with the device, and not looking at the device but is near the device, the device might emit a relatively soft audible tone to get the user's attention. If the user is further away from the device in that situation, the device might emit a louder audible tone. If the device is positioned in a cradle within a viewable range of the user's current viewing direction, the device might flash a message and emit an audible tone only if the user does not look at the device. If the device detects that there are other people around, determines from the calendar that the user is in a meeting, or determines from location information that the user is in a restaurant, for example, the device might not emit an audible tone at all, but might only display information, vibrate, or perform another such action. If the device has a pressure sensor or other such element that indicates that the device is likely in the user's pocket, for example, the device might not display information at all, but might vibrate or emit a loud sound. Various other such options can be provided as well. Even when the device is in a pocket, for example, the device can use noise and other signals (e.g., Bluetooth proximity) to perform actions such as to call for battery charging assistance or to alert its owner that the device is lost until a person is perceived nearby, etc. As discussed previously, certain actions might only be performed when a person is detected nearby, for example, to minimize the potential distraction of periodically emitting notification sounds, etc.

The device also can be configured to perform different actions based upon other aspects in addition to the current surroundings, such as the time of day or day of the week. For example, the device can be configured to display certain types of information (e.g., business-related information) during the day on weekdays, and more personal information (e.g., sports scores, social networking information, etc.) at other times. The device also can be configured to provide different types of notifications at these times, as well as to perform various other alternating functions. Such an approach enables a user to utilize a device for both work and personal time, with the performance of the device substantially following an appropriate role at any given time (e.g., acting as a work device during work hours and a personal device during personal hours). As another example, a device can be configured to show work-related messages during the day, and social messages only during the evening. A user also might be able to select a ring tone to be played on evenings and weekends, while a conventional notification can be used at other times. While some embodiments might allow for such changes based on location, such as to use a certain profile when a user is determined to be at the user's place of business, the user might want to make changes based on certain times as a user might be on a business lunch, with a colleague away from the office, etc., and might not want the device to revert to the personal settings. In some embodiments, a user has the option of manually selecting the current role or profile to use and/or can override the current device selection.

A device also can attempt to track behavioral information of the user over time in an attempt to customize the functionality of that device for the user. For example, a user might only show interest in certain types of information while at work, so the device can learn to only show those types of information. Further, a user might have a specific reading speed, or use a certain glance period to perform an input, etc., to which the device can learn and adapt. If a user always performs a certain action, such as to store a copy of an email message after reading, the device can learn this behavior and being to perform those actions on behalf of the user.

Various other approaches can be used as well to attempt to reduce the distraction probability of changes in information displayed on a device. For example, in some embodiments the device can include a filter on the screen that substantially prevents people from viewing information from certain directions. This filter can be a passive filter, always blocking viewing from specific angles, or an active filter, determining the relative position of others nearby and attempting to block the information from being viewed from those angles. Further, other types of displays (e.g., e-ink displays) can be used that are much more subtle than LCD screens, for example, such that transitions will be much less distracting than on other types of display.

A device also can attempt to provide information based upon various actions in the environment that are not directed toward the device. For example, a device might analyze audio information captured during a meeting. If someone in the meeting (the user or otherwise in various embodiments) brings up ordering a pizza, the device might display the menu from the typical pizza establishment. If someone says to call a given person, the device can lookup and provide the number, and potentially provide an option for the user to call or automatically call that other person. If someone new walks into the room, or the user looks at a particular person and looks back at the device, the device can display information such as name, title, and other information relating to that new person. Various other types of information can be determined and displayed as should be apparent in light of the teachings and suggestions contained herein.

Figure 11:
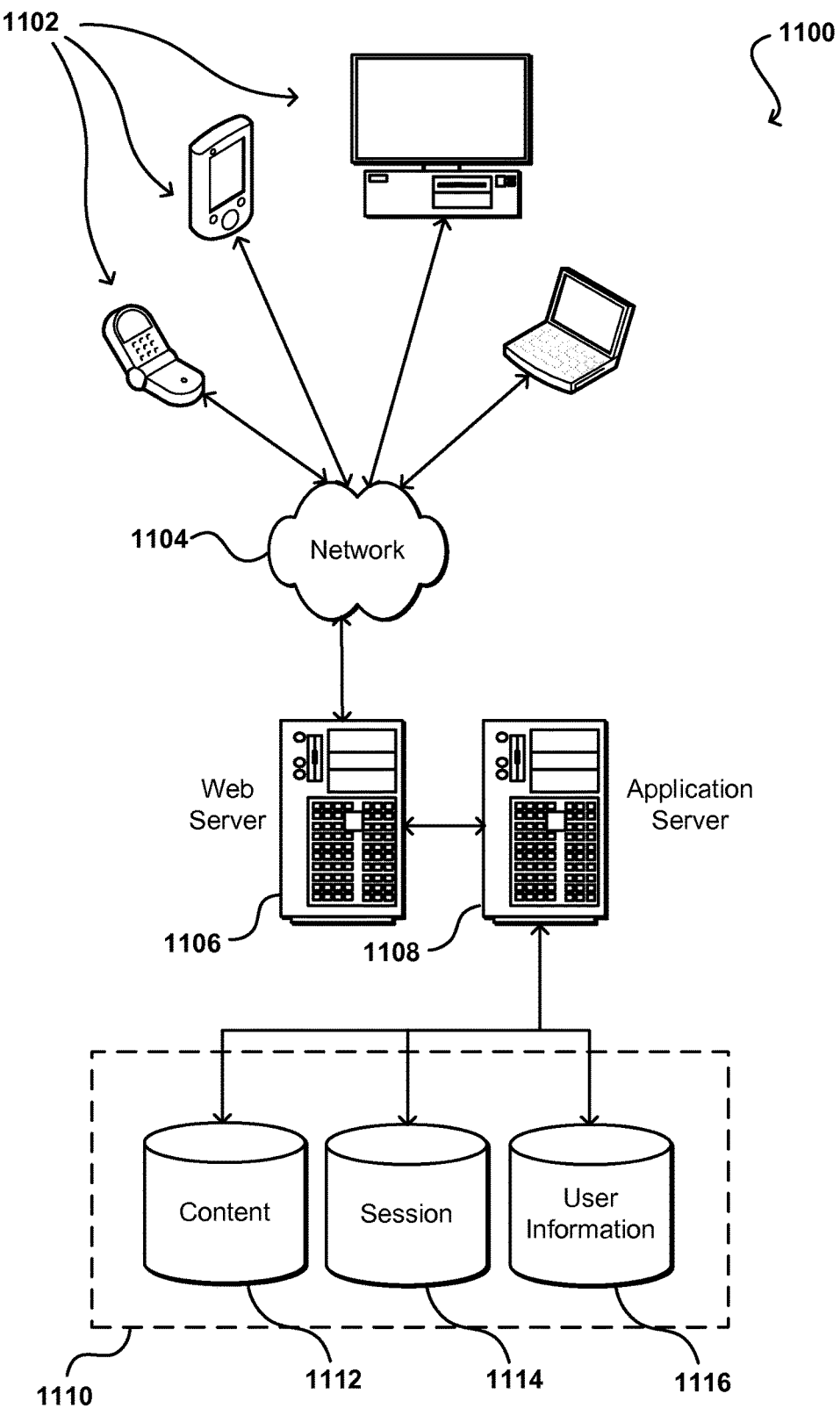
FIG. 11 illustrates an environment in which various embodiments can be implemented.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for enabling a user to interface with an electronic device, comprising:
    receiving image data from at least one image capture element of the electronic device;
    analyzing the image data to determine at least one period during which a viewing direction of a user is in a direction at least substantially toward a display element of the electronic device;
    analyzing the image data to determine a relative orientation angle between the user and a plane of the display element of the electronic device;
    determining information to be displayed on the display element based at least upon a movement or gesture represented in the image data;
    determining an adjusted rendering angle and elongation based at least in part on the relative orientation angle between the user and the plane of the display element;
    displaying, during the at least one period, the information on the display element according to the adjusted rendering angle and the elongation so that the information appears in a normal aspect ratio and at a normal angle to the user;
    analyzing additional image data received from the at least one image capture element of the electronic device to determine one or more gestures; and
    displaying additional information based at least upon the one or more gestures and the relative orientation angle between the user and the plane of the display element.

2. The computer-implemented method of claim 1, wherein determining the information to be displayed further comprises:
    determining the information based at least in part on an identity of the user.

3. The computer-implemented method of claim 1, further comprising:
    enabling the user to activate the display element based upon the viewing direction of the user being in the direction at least substantially toward the display element of the electronic device.

4. The computer-implemented method of claim 1, further comprising:
    determining that the viewing direction of the user is in a direction away from the display element for a threshold period of time; and
    adjusting the display element to prevent the information from being displayed on the display element.

5. The computer-implemented method of claim 1, further comprising:
    determining the viewing direction of the user based upon at least one of a head position of the user, a gaze direction of the user, or the movement or the gesture.

6. The computer-implemented method of claim 1, further comprising:
    determining, during at least one second period, that the viewing direction of the user is in the direction at least substantially towards the display element for at least a threshold amount of time; and
    displaying additional information on the display element during the at least one second period.

7. The computer-implemented method of claim 1, further comprising:
    determining a viewing direction of a person other than the user is in a direction that is substantially toward the display element; and
    adjusting the display element to prevent the information from being displayed on the display element.

8. A computer system, comprising:
    at least one processor;
    at least one display element;
    at least one image capture element; and
    at least one memory device including instructions operable to be executed by the at least one processor to perform a set of actions, enabling the computer system to:
        receive image data from the at least one image capture element of the computer system;
        analyze the image data to determine at least one period during which a viewing direction of a user is in a direction at least substantially towards the at least one display element of the computer system;
        analyze the image data to determine a relative orientation angle between the user and a plane of the at least one display element of the computer system;
        determine information to be displayed on the at least one display element based at least upon a movement or gesture represented in the image data;
        determine an adjusted rendering angle and elongation based at least in part on the relative orientation angle between the user and the plane of the at least one display element;
        display, during the at least one period, the information on the at least one display element according to the adjusted rendering angle and the elongation;

analyze additional image data received from the at least one image capture element of the computer system to determine one or more gestures; and display additional information based at least upon the one or more gestures and the relative orientation angle between the user and the plane of the at least one display element.

9. The computer system of claim 8, wherein the at least one image capture element includes one of an ambient light still camera, an ambient light video camera, an infrared imaging element, or a thermal imaging element.

10. The computer system of claim 8, wherein the at least one display element includes a filter for substantially blocking viewing the information on the at least one display element in at least one direction.

11. The computer system of claim 8, wherein the instructions when executed further cause the computer system to:

determine the information based at least in part on an identity of the user.

12. The computer system of claim 8, wherein the instructions when executed further cause the computer system to:

enable the user to activate the at least one display element based upon the viewing direction of the user being in a direction at least substantially toward the at least one display element of the computer system.

13. The computer system of claim 8, wherein the instructions when executed further cause the computer system to:

determine that the viewing direction of the user is in a direction away from the at least one display element for a threshold period of time; and adjust the at least one display element to prevent the information from being displayed on the at least one display element.

14. The computer system of claim 8, wherein the viewing direction of the user is determined based upon at least one of a head position of the user, a gaze direction of the user, or the movement or the gesture.

15. A computing device including instructions that, upon being executed by a processor of a computing device, cause the computing device to:

determine at least one period during which a viewing direction of a user is in a direction that is at least substantially toward a display element of the computing device;

determine a relative orientation angle between the user and a plane of the display element of the computing device;

determine information to be displayed on the display element based at least upon a gesture;

determine an adjusted rendering angle and elongation based at least in part on the relative orientation angle between the user and the plane of the display element;

display, during the at least one period, the information on the display element according to the adjusted rendering angle and the elongation;

analyze additional image data received from at least one image capture element of the computing device to determine one or more gestures; and display additional information based at least upon the one or more gestures and the relative orientation angle between the user and the plane of the display element.

16. The computing device of claim 15, wherein the instructions, upon being executed by the processor of the computing device, cause the computing device to:

determine, during at least one second period, that the viewing direction of the user is in the direction at least substantially towards the display element for at least a threshold amount of time; and display additional information on the display element during the at least one second period.

17. The computing device of claim 15, wherein the instructions, upon being executed by the processor of the computing device, cause the computing device to:

determine a viewing direction of a person other than the user is in a direction that is substantially toward the display element; and adjust the display element to prevent the information from being displayed on the display element.

\* \* \* \* \*